United States Patent
Bauchot et al.

(10) Patent No.: US 7,789,306 B2
(45) Date of Patent: *Sep. 7, 2010

(54) VOTING METHOD

(75) Inventors: Frederic Bauchot, Saint-Jeannet (FR); Jean-Yves Clement, Saint-Jeannet (FR); Gerard Marmigere, Drap (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/264,941

(22) Filed: Nov. 5, 2008

(65) Prior Publication Data

US 2009/0121018 A1    May 14, 2009

(30) Foreign Application Priority Data

Nov. 9, 2007    (EP) .................................. 07301534

(51) Int. Cl.
G06K 17/00    (2006.01)
(52) U.S. Cl. ............................. 235/386; 235/51; 705/12
(58) Field of Classification Search .................... 235/51, 235/863, 386; 705/12
See application file for complete search history.

(56) References Cited

U.S. PATENT DOCUMENTS

| | | | |
|---|---|---|---|
| 5,291,434 A * | 3/1994 | Kowalski | ............... 365/185.04 |
| 7,178,730 B1 | 2/2007 | Jamison et al. | |
| 2002/0175805 A9 * | 11/2002 | Armstrong et al. | ........ 340/10.31 |
| 2006/0196939 A1 | 9/2006 | Kim et al. | |
| 2007/0012767 A1 | 1/2007 | Homewood et al. | |
| 2007/0051805 A1 * | 3/2007 | Iyer et al. | ................... 235/386 |
| 2008/0136592 A1 * | 6/2008 | Malik et al. | ................ 340/10.1 |

FOREIGN PATENT DOCUMENTS

JP    2005-141589    *    6/2005

OTHER PUBLICATIONS

Lopresti et al., Chipless ID for Paper Documents; Technical Report LU-CSE-05-010; Presented at Document Recognition and Retrieval XII (IS&T/SPIE International Symposium on Electronic Imaging), San Jose, CA, Jan. 2005; 11 pages.

* cited by examiner

*Primary Examiner*—Michael G Lee
*Assistant Examiner*—Keith Goodman, Jr.
(74) *Attorney, Agent, or Firm*—Schmeiser, Olsen & Watts; William H. Steinberg

(57) ABSTRACT

A voting method. A ballot paper is received. The received ballot paper includes a recorded vote. The recorded vote includes candidate/party information for an election held on a voting day in a jurisdiction. The ballot paper includes a burnable radio frequency identification (RFID) tag including an on-tag fuse that is not blown. The recorded vote is not revealable while the fuse is not blown and is revealable in response to the fuse being subsequently blown. After the ballot paper is received, the ballot paper is authenticated and the fuse is blown to reveal the recorded vote, followed by counting the ballot paper and directing the ballot paper to a candidate box.

20 Claims, 6 Drawing Sheets

VOTING METHOD

FIELD OF THE INVENTION

The present invention relates to the field of ballot paper counting method and more particularly to a method to strengthen an integrity of a voting process when authenticating and counting ballot papers.

BACKGROUND OF THE INVENTION

They are different methods to maximize the credibility and integrity of the vote counting process when initiating a voting procedure.

Some of them consist of counting ballots manually, mechanically and/or electronically. In each case, there is a balance between integrity, accuracy and speed. A common characteristic of these methods is to minimize opportunities for fraud and manipulation and ensuring that the public perception of the counting of votes is a simple, straightforward and non-partisan process.

A manual method, like the hand counter process, attempts to do the very best to be nonbiased and fair. Such a manual method has a degree of subjectivity that is an extremely important issue in a process where no subjectivity is allowed. Moreover, a manual method is not suitable for counting a large quantity of ballots quickly.

Today's trend of the voting process uses generally a computerized method for counting votes. Electronic and mechanical methods, whether mixed together or not, can provide an accurate and speedy vote count and announcement of results. Whereas such methods seem to offer a robust identification mechanism, numerous external situations can compromise the privacy of the voter as well as the counting process accuracy.

One computerized method consists of using a PC compatible with a touch screen especially packaged for voting, like the "Electrovote 2000" voting machine sold by Fidlar-Doubleday (formerly Fidlar and Chambers). Such a system includes a flat panel display screen on the voting machine that has a very poor off axis viewing, so the privacy is a bit better than the minimal booth suggests.

A more sophisticated system, PC based, incorporates a smartcard interface, like the "Global Election Systems Model 100 Electronic Ballot Station". In use, the machine is enabled by entering an ID code on the screen corresponding to the polling place and each voter is given a smartcard that is available for one use. Even if using a smartcard avoids over voting in a voting machine similar to the "Electrovote 2000", the system has a very poor off axis viewing. Furthermore, the smartcard is considered as a voter's token and does not contain any confidential data related to the candidate/party that minimizes considerably the solution interest.

Another system, based on direct recording electronic voting machines, incorporates push buttons with associated light, like the "Microvote Electronic Voting Computer". The system consists of using push buttons adjacent to each ballot item to cast votes, with a light by each button giving positive feedback that the vote has been registered. Such a system contains only 64 buttons. Many voting processes, like elections, would require significantly more than this if the full ballot were to be displayed at once. The system can be extended for displaying more candidates by using a complex ballot paging. A better displaying on a single scroll, side by side is required to the voter that wants to work through the issues on the ballot that seems to be difficult to handle.

A standardized ballot, punched card based, was first used for vital statistics tabulation before adopted for voting process by using a "Votomatic" technology. The punched card contains a tabulation of pre-printed information representing a matrix of voting positions. Generally, in many systems that use a punched card method, the ballot is pre-scored at each voting position so that punching with a stylus through that position into an appropriate backing will remove a rectangle of chad, leaving a hole that is counted as a vote. Then, the ballot card is held in proper alignment and is inserted into a voting machine. The voting machine checks that a voted ballot paper is legitimate and deposits it in the ballot box for later countering. The counting machine does not recognize circling or underlining ballots and multiple votes are ignored.

Finally, the ballots are stacked for tabulation and processed by using either a computer equipped with a standard punched-card reader or by an electromechanical punched-card tabulating machine. Unfortunately, in some cases the punched card process may compromise the counting method accuracy.

Statistically a punched card may contain a dimple in a position instead of a cleanly punched hole. This is due to either a voter hesitation or a pre punched card failure. In addition, some punch positions on the ballot can be directly over internal braces, inside the voting machine mechanism, that can develop undesirable chad jams. The development of chad jams that are accumulated in areas where ballots are being processed may represent votes added to some candidates by accident. It is also possible to obtain a ballot that has a completely removed chad for one candidate but also has a chad with one corner punctured for another candidate in the same race. This ballot has to be counted as a vote. The presence of dimples and undesirable chads initiates a hand recount process and it is difficult for a human by looking a dimple or an incoherent chad to determine the voter's intent.

Some electronic voting machines allow voters to show their choices and stop them if they try to over vote. These machines allow voters to review their choices and ballots before turning them in. The name of candidates and the text of ballot questions are not printed on ballots that are based on a punch card method. This is a reason why some organizations switch from punch cards to optical scan, in which voters fill in ovals with a pencil. In certain circumstance, it is possible to twist a ballot. Twisting a ballot can produce several "votes" on a punch card ballot that has already been counted by machines three or more times that is considered as over voting. In this case, over voting invalidates the vote.

To summarize, the aforementioned voting systems and methods present several drawbacks. Some of the main drawbacks are as follows.

A manual method, like the hand counter process, has a degree of subjectivity that is unacceptable in such a voting process. Moreover, a hand counter process is not appropriate when counting a large quantity of ballots and is subject to mistakes, such as over voting and/or any ballot rigging, that a skilled person in the art can easily imagine.

A touch screen electronic computerized method compromises the privacy of the voter when using a flat panel display screen on the voting machine that has a very poor off axis viewing.

A system based on push buttons is too difficult to be manipulated easily by a voter.

A computerized method, punched card based, when applying in a large range of ballots, generates undesirable chads. The difficulty to recognize a legitimate ballot when some undesirable chads appear on the card and a necessity to hand recount ballots when a ballot fails in conformity are time consuming in a process that needs to provide results quickly.

As mentioned above, prior art solutions make the existing methods not fully appropriate to achieve an efficient vote counting process while guarantying full integrity, preventing ballot rigging, and allowing full audit.

The present invention offers a solution to solve the aforementioned problems.

SUMMARY OF THE INVENTION

The present invention provides a voting method, comprising:

receiving a ballot paper that includes a recorded vote comprising candidate/party information for an election held on a voting day in a jurisdiction, said ballot paper comprising a burnable radio frequency identification (RFID) tag that includes an on-tag fuse that is not blown, said recorded vote not being revealable while the fuse is not blown and being revealable in response to the fuse being subsequently blown;

after said receiving, authenticating said ballot paper;

after said authenticating, blowing the fuse to reveal the recorded vote; and after said blowing the fuse, counting the ballot paper and directing the ballot paper to a candidate box.

BRIEF DESCRIPTION OF THE DRAWINGS

The above and other items, features and advantages of the invention will be better understood by reading the following more particular description of the invention in conjunction with the accompanying drawings.

DETAILED DESCRIPTION OF THE INVENTION

Figure 1:
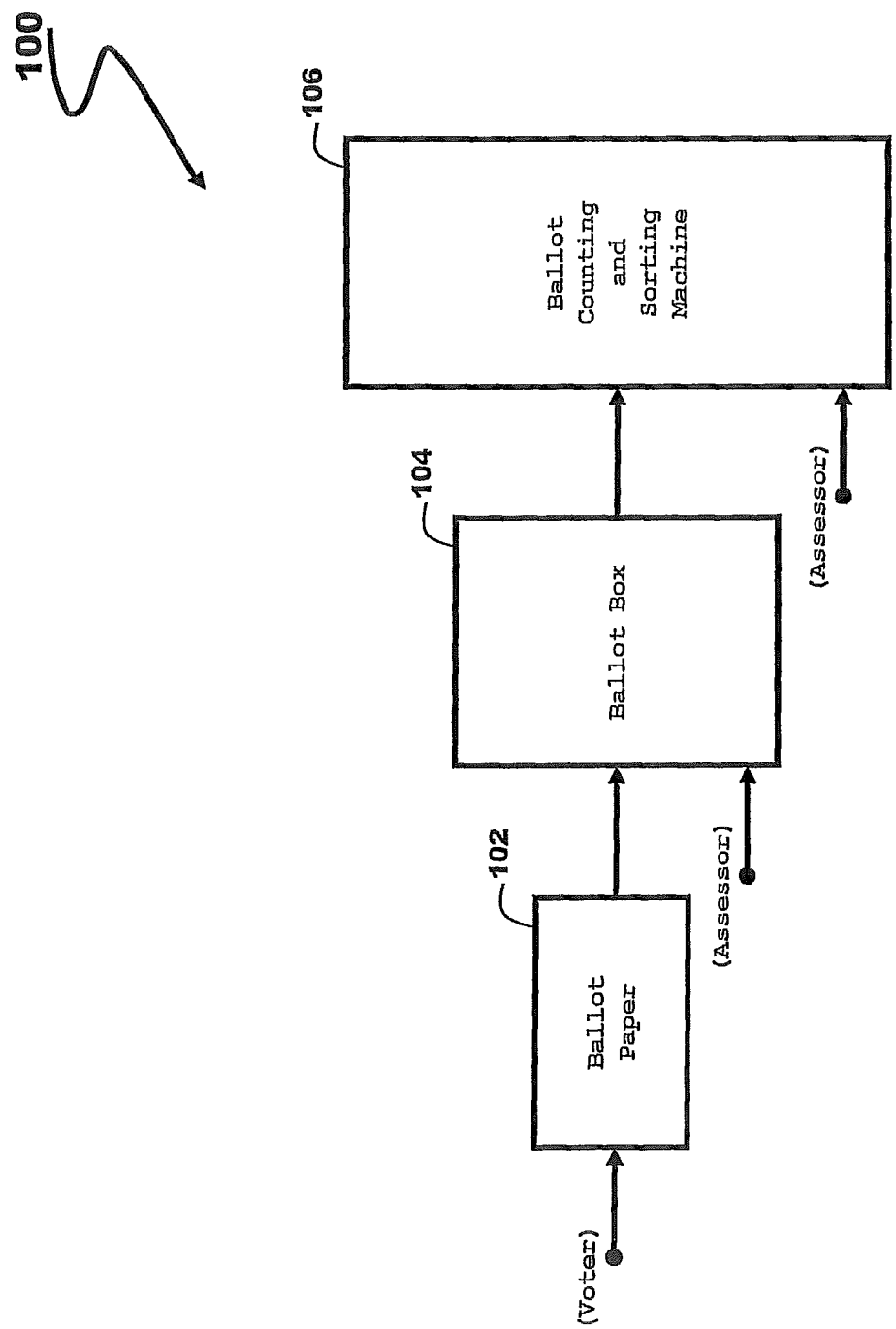
FIG. 1 illustrates by schematic block diagram the relationship between the elements for practicing embodiments of the present invention.

Embodiments of the invention are described herein after by way of examples with reference to the accompanying figures and drawings.

The present invention to provide a system for tracking ballot papers, allowing strengthening of the audit integrity of a voting process by the use of the radio frequency identification (RFID) technology.

The present invention integrates a wireless apparatus, RFID tag wireless capabilities for monitoring a voting process mechanism, ensuring that all parts involved in the action are completely protected against ballot rigging during operation.

The present invention uses an on-tag fuse mechanism embedded in the ballot paper to protect the integrity and confidentiality of the voted ballot paper during operation.

The present invention uses a jurisdiction's private/public signature and its associated checksum mechanism to control dynamically the validity of the ongoing ballot paper.

The present invention certifies the ongoing ballot paper, in real time, by encoding an assessor's private/public signature key in a field of an RFID tag located in a Ballot Paper.

The present invention interprets the information encrypted in the ballot paper by beaming the RFID tags located in the ballot paper.

The present invention blows the on-tag fuse of a burnable RFID tag to free the confidential candidate information when initiating the sorting and counting process.

The present invention rejects a ballot paper non-compliant with the jurisdiction's expectations loaded in a dedicated RFID tag to an external compartment.

The present invention rejects a ballot paper that is not certified by an assessor's signature key loaded in a dedicated RFID tag.

The present invention rejects a ballot paper that has already been blown, from the voting process, which indicates the non-integrity of the ongoing ballot paper.

The present invention uses a wireless tracking system by mixing both reading and writing a RFID tag in real time in concert with the stating of an on-tag fuse RFID tag, all of them implemented either on the surface or embedded in the substrate of a Ballot Support.

A first aspect, the present invention tracks ballots and performs method allowing strengthening of the audit integrity of a voting process by using the RFID technology.

RFID is suitable for high technology wireless electronic systems based on message identification. The wireless systems allow a readable machine to pick up messages stored on the tag device. The readable machine reads the notification message, identifies the device, and then performs an action which is indicated in the stored message.

The present invention is suitable for various countries where an election process in a jurisdiction occurs as well as in areas where cast and count is a necessity to legitimatize a vote.

Even if some solutions offer a wide variety of different RFID standards, an implemented embodiment of the present invention is motivated by the need to provide a high-quality voting system at low cost. This is accomplished through a voting system approach using passive RFID tags.

In an embodiment of the present invention, the disclosed RFID system uses RFID technology that is compatible with ISO standards, including but not limited to ISO14443, ISO15693, ISO 18000 series.

FIG. 1 illustrates a schematic block diagram depicting the relationship between the elements for practicing embodiments of the present invention. A voting system (100) uses the RFID technology and its associated facilities are methodically implemented. The voting system (100) combines a Ballot Paper (102) and a Ballot Box (104) that work in concert with a Ballot counting and sorting Machine (106).

The Ballot Paper (102) contains confidential authentications that are stored in embedded electronic devices and interact directly with the Ballot Box (104). The Ballot Box (104) receives a Ballot Paper (102) that a voter rolls into for inspection. The Ballot Box (104) controls the authentication of the inserted Ballot Paper (102) by screening the electronic content previously encoded and confirms its authentication by generating a conformity electronic key and storing the generated conformity electronic key in an electronic device present in the Ballot Paper (102). The Ballot Box (104) rolls out the correct Ballot Papers (102). A series of Ballot Papers (102) are inserted into the Ballot counting and sorting Machine (106) to be checked before initiating a vote counting process. The Ballot counting and sorting Machine (106) verifies the authentication of the inserted Ballot Paper (102) by screening the electronic content previously encoded and initiates a vote sorting and counting process accordingly.

Figure 2:
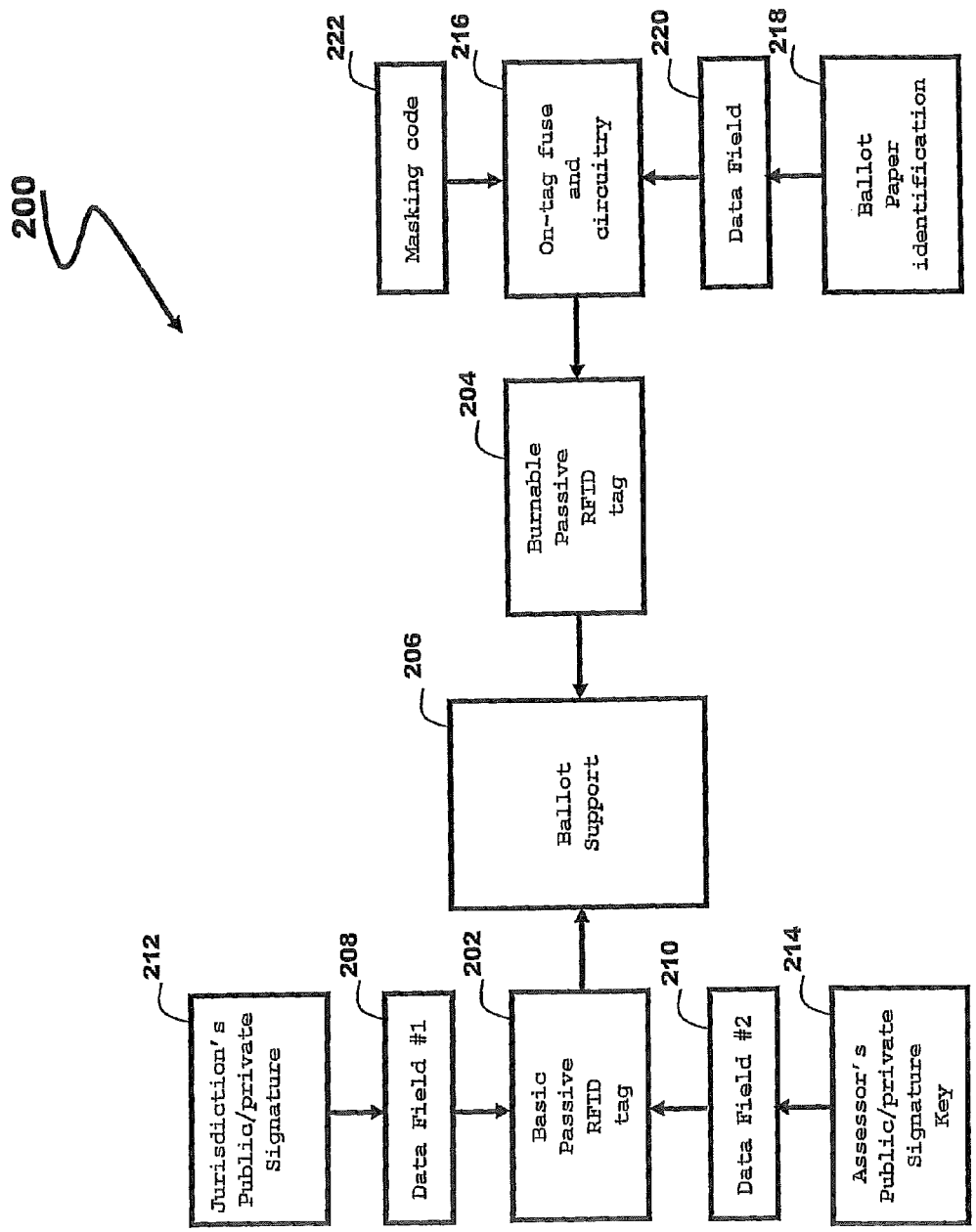
FIG. 2 sets out full details of the Ballot Paper as represented in a voting system arrangement, in accordance with embodiments of the present invention.

FIG. 2 sets out full details of the Ballot Paper as represented in a voting system arrangement, in accordance with embodiments of the present invention.

The design layout of the Ballot Paper (200) is similar to a classic ballot paper. It provides a voter with clear printed instructions for facilitating the choice of candidates in a valid manner as well as symbols or/and candidate pictures and essential information that printed ballot papers should contain.

The difference resides in the inclusion of two electronic devices represented by a basic passive RFID tag (202) and a burnable passive RFID tag (204). The inclusion of such RFID tags (202, 204) allows the Ballot Paper (200) to be safely authenticated and easily tracked all along the voting process. The RFID tags (202, 204) can be implemented either on the surface or embedded in the substrate of a Ballot Support (206).

The electronic personalization of the Ballot Paper (200) is defined by its instruction set, which is encoded in the basic passive RFID tag (202), at a configuration step, when emitted by the jurisdiction. The basic passive RFID tag (202) works differently from the burnable passive RFID tag (204). The basic passive RFID tag (202) requires two data fields (208, 210) both working in write once and read multiple modes.

The first data field (208) contains a jurisdiction's signature (212) that identifies a genuine versus counterfeited ballot paper. The jurisdiction's signature (212) is encrypted with a private key belonging to an emitting authority to be disclosed on the voting day. The emitting authority is associated with the jurisdiction.

The jurisdiction's signature (212) is generated and stored during the configuration of the Ballot Paper (200) and cannot be modified. The jurisdiction's signature (212) allows keeping track of the authentication integrity of the Ballot Paper (200) and thereby warrants that the voting processing operates in a secure protocol.

The second data field (210) stores an assessor's signature key that is composed of a hashing of the assessors individual secret keys (214). The assessor's signature key (214) is generated during the vote processing of the Ballot Paper (200). Like the first data field (208), the second data field (210) is unchangeable.

The assessor's signature key (214) is put on the second data field (210) after authenticating the Ballot Paper (200), once inserted in the Ballot Box. It is noted that the assessor's signature key (214) can concatenate different information that form a secure encrypted message, like an assessor identification, via a personal key, when validating the voter's act and/or a ballot number. Depending on the voting strategy, the assessor's signature key (214) can also contain a voter's voting choice, like the name of the candidate if the Ballot Paper has not been personalized yet.

In contrast with the basic passive RFID tag (202), the burnable passive RFID tag (204) includes an on-tag fusing facility and its associated electronic circuitry (216).

Such technique includes developing, implementing and manufacturing on-tag extra circuitry which is capable of handling a predefined action, if needed. An external fuse blowing system is required to set the on-tag fuse in any manner known in the art, (i.e. laser fuse blow, electrical fuse blow and so on). In one embodiment of the present invention, the burnable passive RFID tag is a chipless tag.

Once the on-tag fuse is blown, the internal circuitry of the burnable passive RFID tag (204) works differently than before and is capable to present other data to the RFID reader.

When initiating an election process, it is very important to protect the integrity of a Ballot Paper (200) and track any potential violation occurring during the voting cycle. To meet these requirements, the burnable passive RFID tag (204) has a hard-coded ballot paper identification (218) embedded in its data field (220).

The burnable passive RFID tag (204) operates in twofold.

Firstly, the non-blowing of the on-tag fuse (216) warrants the Ballot Paper (200) integrity including the confidentiality of the name of the candidate/party during the voting process until the final counting and sorting are initiated. The embedded hard-coded ballot paper identification (218) cannot be accessible by a RFID reader, a RFID tag cleaner/eraser, or an eavesdropping mechanism allowing undesirable rigging. The hard-coded ballot paper identification (218) hosts unchangeable data related to information on candidate/party, at least the party or candidate name or any other information that a skilled person in the art can easily imagine. Non-blowing on-tag fuse (216) preserves Ballot Paper (200) authenticity. A masking code (222) hides the content of the embedded hard-coded ballot paper identification (218) until the on-tag fuse (216) is intact.

Secondly, the blowing of the on-tag fuse (216) frees the hard-coded ballot paper identification (218) hosted in the RFID tag data field (220) that reveals the candidate/party information to be identified by the Ballot counting and sorting Machine (106). Blowing on-tag fuse (216) is irreversible and makes the Ballot Paper (200) unique and not reusable. An adequate mechanism (not shown here) reads, controls, and validates the hard-coded identification at the counting and sorting step.

Figure 3:
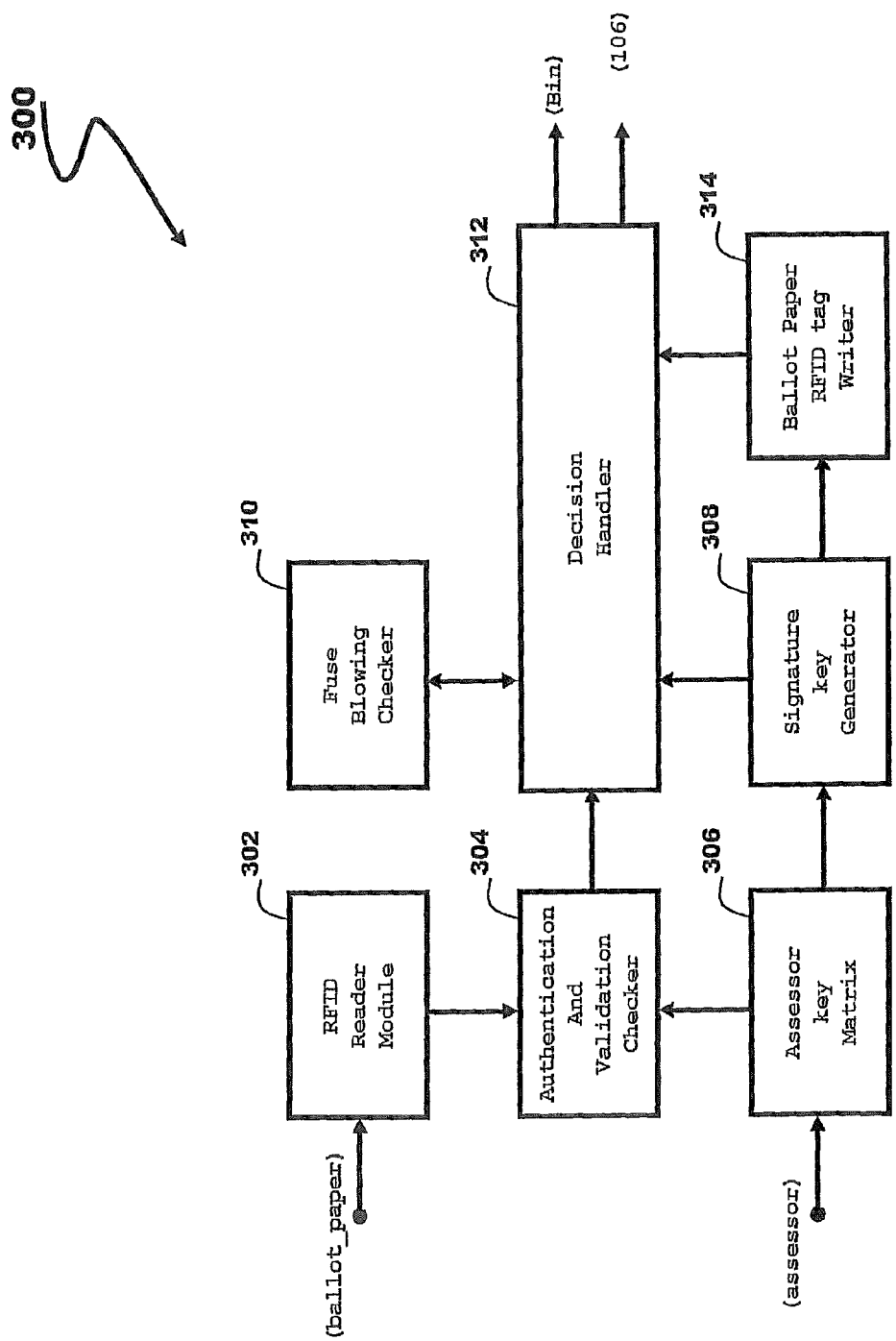
FIG. 3 sets out full details of the Ballot Box as represented in the voting system arrangement, in accordance with embodiments of the present invention.

FIG. 3 describes details of the Ballot Box, in accordance with embodiments of the present invention. The Ballot Box (300) comprises a RFID Reader Module (302), an Authentication and Validation Checker (304), an Assessor Key Matrix (306), a Signature Key Generator (308), a Fuse Blowing Checker (310), a Decision Handler (312) and a Ballot Paper RFID tag Writer (314).

The process starts when a voter inserts a Ballot Paper (102) in the Ballot Box (300). It is to be noted that, alternatively, the Ballot Paper may be inserted first in an envelope to make the voter's act more confidential.

The RFID Reader Module (302) beams the inserted ballot paper, reads data from RFID tag registers, and transmits the inserted ballot paper beaming data to the Authentication and Validation Checker (304).

The Authentication and Validation Checker (304) receives the inserted ballot paper beaming data from the RFID Reader Module (302) and initiates an authentication procedure. Typically, the authentication procedure decrypts the jurisdiction's signature with a jurisdiction public key and compares the jurisdiction's decrypted signature to the jurisdiction's specific fixed number which is a jurisdiction code constant. The emitting authority discloses the jurisdiction's specific fixed number on the voting day. Both the jurisdiction's specific fixed number and the jurisdiction's public key are stored during the configuration of the Ballot Box.

The Authentication and Validation Checker (304) is coupled to the Assessor Key Matrix (306) and interfaces with the Decision Handler (312). The Decision Handler (312)

receives data from the Signature Key Generator (308) and the Ballot Paper RFID tag Writer (314) and interacts with the Fuse Blowing Checker (310).

The Assessor Key Matrix (306) allows an assessor to enter the confidential jurisdiction code constant (i.e., the jurisdiction's specific fixed number) before starting the voting process. The jurisdiction delivers the confidential jurisdiction code constant. It is just valid for a day, like the current voting day, and cannot be modifiable by a third party.

The Authentication and Validation Checker (304) runs the jurisdiction's signature (212) located in the first data field (208) of the basic RFID tag (202) through its checker. Then, it compares the jurisdiction's signature with the confidential jurisdiction code constant previously entered by the assessor, starts authentication of a valid ballot paper, and sends the authentication result to the Decision Handler (312).

The Decision Handler (312) identifies the ballot paper that corresponds to a valid result and rejects the other ones to a bin (Bin) outside the ballot box.

To authenticate a voted ballot paper in regards to the jurisdiction, the identified ballot paper receives an assessor's signature key (214) from an assessor, via the Signature Key Generator (308).

The Signature Key Generator (308) inputs the assessor data entered by the use of the Assessor Key Matrix (306) and generates the assessor's signature key (214), authenticating the voted ballot paper, accordingly. Then, Ballot Paper RFID tag Writer (314) writes the signature key into the second data field (210) of the basic RFID tag (202).

There exist different possibilities for creating such signature key (214), including: either a removable keyboard for keying the encrypted key; a memory plug interface, like USB or memory or smartcard, for connecting a personal encrypted key module holding an individual code; or by using other electronic apparatus that a person who is skilled in the art can easily imagine.

Then the Decision Handler (312) transmits the voted ballot paper to the Fuse Blowing Checker (310). The Fuse Blowing Checker (310) checks that a voted ballot paper is still blank, meaning that the fuse is not blown. The Fuse Blowing Checker (310) operates by stating the non-blowing of the on-tag fuse of the burnable passive RFID tag (204) and by reading the information hosted in the RFID tag data field. The Fuse Blowing Checker (310) communicates results to the Decision Handler (312).

The Decision Handler (312) identifies the ballot paper that corresponds to a legitimate voted ballot paper and rejects the other ones to a bin (Bin) outside the ballot box. The legitimate voted ballot is output from the Ballot Box (300) to be counted and sorted by using the Ballot counting and sorting Machine (106). As mentioned above, the legitimate voted ballot paper is generally inserted in an envelope to make the voter's act confidential.

Figure 4:
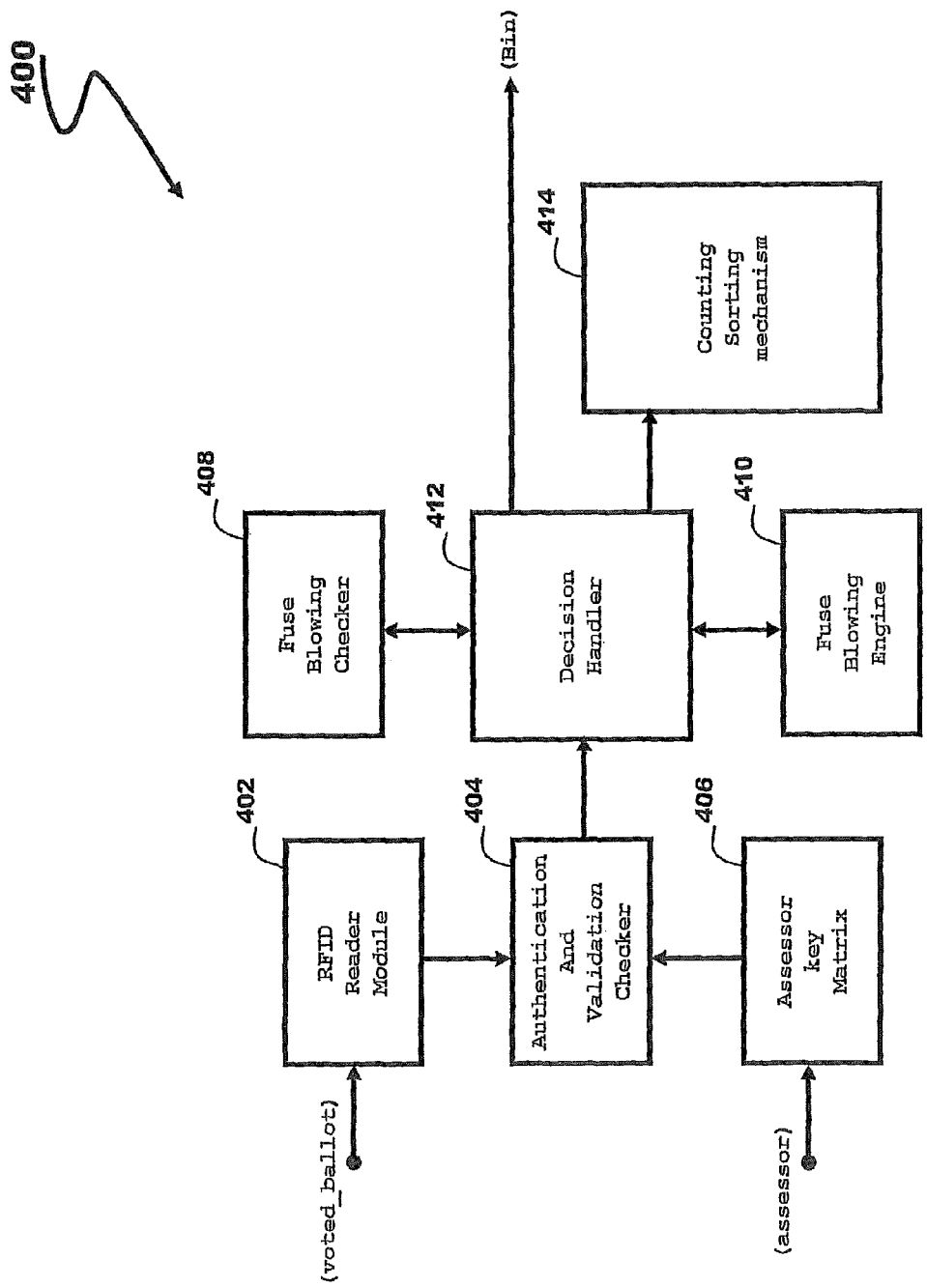
FIG. 4 shows full details of the Ballot counting and sorting machine as represented in the voting system arrangement, in accordance with embodiments of the present invention.

Referring now to FIG. 4, details of the "Ballot Counting and Sorting Machine" is described, in accordance with embodiments of the present invention. The "Ballot Counting and Sorting Machine" (400) comprises a RFID Reader Module (402), an Authentication and Validation Checker (404), an Assessor Key Matrix (406), a Fuse Blowing Checker (408), a Fuse Blowing Engine (410), a Decision Handler (412), and a counting-sorting mechanism (414).

The process starts when ballots to be counted, that were preliminarily checked and validated through the Ballot Box (104), are loaded into the Ballot Counting and Sorting Machine (400).

The RFID Reader Module (402) beams the loaded ballot paper (voted-ballot), reads data from RFID tag registers in the ballot paper, and transmits the loaded ballot paper beaming data to the Authentication and Validation Checker (404).

The Authentication and Validation Checker (404) receives the loaded ballot paper beaming data from the RFID Reader Module (402) and initiates an authentication procedure.

The authentication procedure decrypts the jurisdiction's signature with a jurisdiction public key and compares the jurisdiction's signature to a jurisdiction's specific fixed number (i.e., confidential jurisdiction code constant). The emitting authority discloses the jurisdiction's specific fixed number on the voting day.

The Authentication and Validation Checker (404) is coupled to the Assessor Key Matrix (406) and interfaces with the Decision Handler (412), the Fuse Blowing Checker (408) and the Fuse Blowing Engine (410).

The Decision Handler (412) interacts with the Fuse Blowing Checker (408), receives data from the Fuse Blowing Engine (410), and initiates the Counting-Sorting Mechanism (414).

An assessor enters both a confidential jurisdiction code constant and a confidential assessor code constant by the use of the Assessor Key Matrix (406). Both code constants allow the Ballot Counting and Sorting Machine (400) to be initialized, protected and locked during the current voting process.

The jurisdiction delivers the confidential code constants. They are just valid for a day, like the current voting day, and cannot be modified by a third party.

The Authentication and Validation Checker (404) works in twofold.

Firstly, it runs the jurisdiction's signature (212) located in the first data field (208) of the basic RFID tag (202) through its checker. Then, it compares the jurisdiction's signature with the confidential jurisdiction code constant, starts authentication of voted ballot paper and sends the authentication result to the Decision Handler (412).

Secondly, it runs the assessor's signature key (214) located in the second data field (210) of the basic RFID tag (202) through its checker. Then, it compares the assessor's signature key with the confidential assessor code constant, which starts authentication of voted ballot paper and sends result to the Decision Handler (412).

It is aforementioned here, that both the confidential jurisdiction code constant and the confidential assessor code constant are inputs that the assessor pre-sets before the process starts.

The Decision Handler (412) authenticates the voted ballot papers that correspond to a valid result, transmits the valid ballots to the Fuse Blowing Checker (408) and rejects the other ballots to a bin (Bin) outside the Ballot Counting and Sorting Machine (400).

The Fuse Blowing Checker (408) checks that a voted ballot paper is still blank. The Fuse Blowing Checker (408) operates by stating the non-blowing of the on-tag fuse of the burnable passive RFID tag (204) and by reading the information hosted in the RFID tag data field. The Fuse Blowing Checker (408) communicates results to the Decision Handler (412).

The Decision Handler (412) authenticates the voted ballot papers that are still blank, transmits the blank ballots to the Fuse Blowing Engine (410) and rejects the other ballots to a bin outside the Ballot Counting and Sorting Machine (400).

The Fuse Blowing Engine (410) receives the authenticated voted ballot paper and starts an on-tag fuse blowing operation of the burnable passive RFID tag (204).

The on-tag fuse blowing operation is irreversible and frees the hard-coded identification hosted in the RFID tag field that reveals the candidate/party information. Thus the on-tag fuse blowing operation enables the voted ballot paper to be read by the Ballot counting and sorting Machine (400). Methods and systems to blow such on-tag fuses are well known in the art and will not be further described.

The authentication of the voted ballot papers is complete and the Decision Handler (412) enables the Counting-Sorting Mechanism (414) to initiate the counting and sorting process. The Counting-Sorting Mechanism (414) reads the voted ballot papers, counts the voted ballot papers, and directs the envelopes containing a voted ballot paper to the pertinent candidate box.

Figure 5:
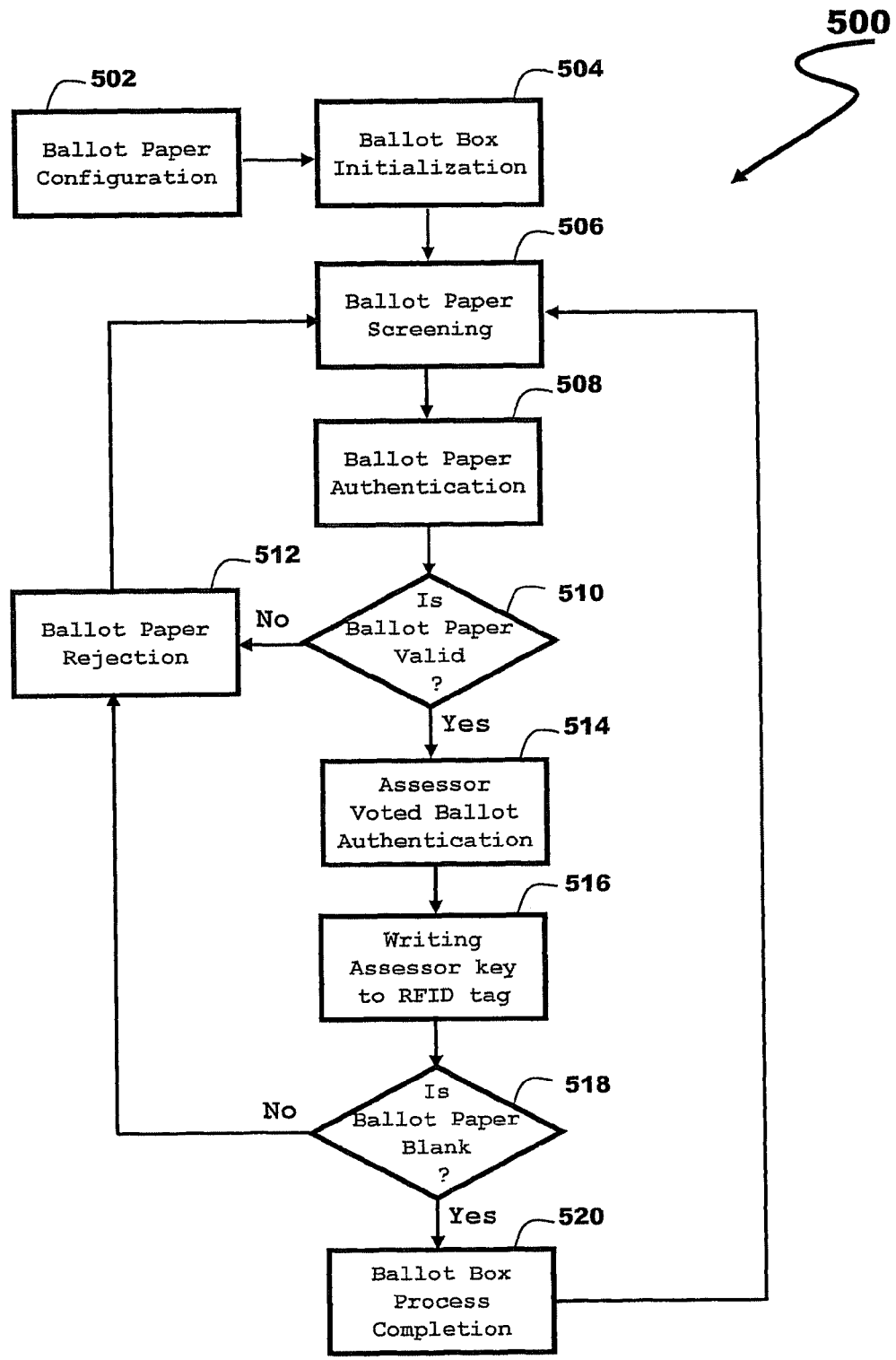
FIG. 5 is a flow chart of the Ballot Box process when a voter inserts a Ballot Paper to be authenticated by the Ballot Box, in accordance with embodiments of the present invention.

FIG. 5 is a flow chart of the Ballot Box process when a voter inserts a Ballot Paper to be authenticated by the Ballot Box, in accordance with embodiments of the present invention.

Before the Ballot Box process starts (500) a ballot paper configuration is required in which an acquisition of the jurisdiction's parameters belonging to the election are to be entered in step 502.

Figure 6:
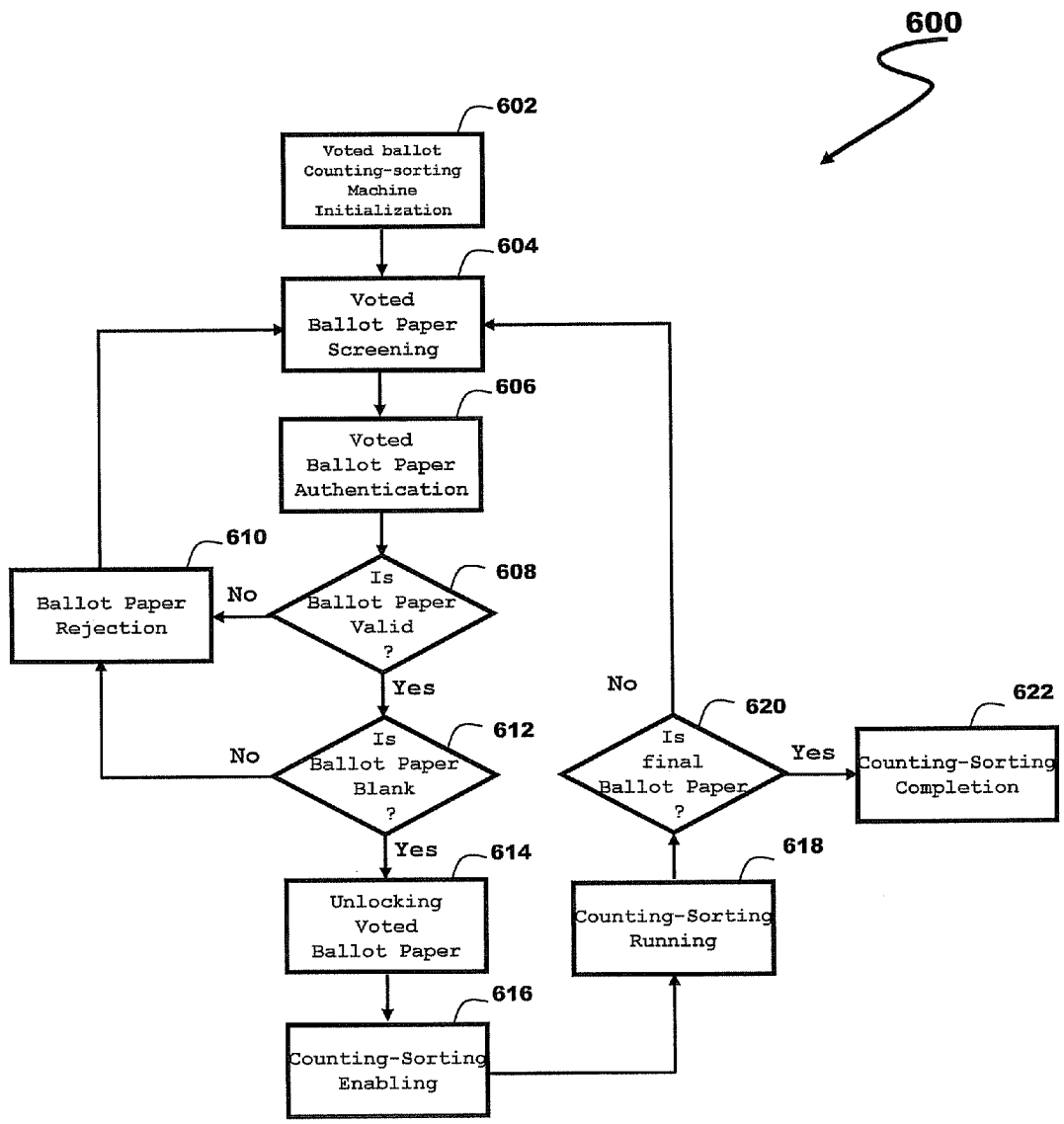
FIG. 6 is a flow chart of the Ballot Sorting and Counting Machine process when voted ballot papers that were preliminarily checked and validated through the Ballot Box process are loaded into the Ballot Counting and Sorting Machine, in accordance with embodiments of the present invention.

After completion of the Ballot Box process in step 520, the process enters the Ballot Sorting and Counting Machine process described infra with reference to FIG. 6.

Step 502 (Ballot Paper Configuration): Jurisdiction configures a blank ballot paper. Design layout and RFID tag electronic personalization of the ballot paper is defined. Jurisdiction's signature is hard-coded in the dedicated field of the basic RFID tag. On-tag fuse of the burnable RFID tag is intact. Then, the process goes to step 504.

Step 504 (Ballot Box initialization): Assessor enters the Jurisdiction's specific fixed number, as well as the jurisdiction's public key by the use of the Assessor Key Matrix (306). Then, the process goes to step 506.

Step 506 (Ballot Paper Screening): Voter inserts a ballot paper in the ballot box. The RFID Reader Module (302) beams the inserted ballot paper (ballot-Paper), reads the ballot paper beaming data from RFID tag registers and transmits the ballot paper beaming data to the Authentication and Validation Checker (304). Then, the process goes to step 508.

Step 508 (Ballot Paper authentication): The Authentication and Validation Checker (304) runs the jurisdiction's public/private signature (212) located in the first data field (208) of the basic RFID tag (202) through its checker. Then, it compares the jurisdiction's signature with the confidential jurisdiction code constant previously entered by the assessor at step 504, starts authentication of a valid ballot paper and sends result to the Decision Handler (312). Then the process goes to step 510.

In step 510, a status is made to check the integrity of the voted ballot paper. The Decision Handler (312) checks the result delivered by the checker computation at step 508. If the result is valid then the corresponding ballot paper is valid and the process goes to step 514; otherwise the ballot paper is not valid and the process goes to step 512.

Step 512 (Ballot paper rejection): Ballot paper is not valid and is rejected by the Decision Handler (312). The rejected ballot paper rolls out to a bin outside the ballot box. Then the process loops back to step 506.

Step 514 (Assessor voted ballot authentication): Assessor enters the Assessor's signature key by the use of the Assessor Key Matrix (306) that initiates the Signature Key Generator (308). A signature key is generated accordingly. Then, the process goes to step 516.

Step 516 (Writing assessor key to RFID tag): Assessor validates the voted ballot paper that enables the Ballot Paper RFID tag Writer (314) for writing the computed signature key into the second data field (210) of the basic RFID tag (202). Then the process goes to step 518.

In step 518, a status is made to check that the voted ballot paper is blank. The Fuse Blowing Checker (310) receives the voted ballot paper and states the on-tag fuse of the burnable passive RFID tag (204). If the Fuse Blowing Checker (310) detects a non-blowing of the on-tag fuse then the voted ballot paper is valid and the process goes to step 520; otherwise the voted ballot paper is not blank and the process goes to step 512.

Step 520 (Ballot Box process completion): The success of the jurisdiction's private/public key identification, the non-blowing of the on-tag fuse, and the insertion of the assessor's private/public key certification into the RFID tag authenticate the integrity of the inserted ballot paper. The voted ballot paper is output from the Ballot Box (300) to be counted and sorted by using the Ballot Counting and Sorting Machine (106). The Ballot Box process is complete then the process loops back to step 506 for authenticating the next ballot paper that a voter inserts in the Ballot Box (300).

FIG. 6 is a flow chart of the Ballot Sorting and Counting Machine process (600) when voted ballot papers that were preliminarily checked and validated through the Ballot Box process are loaded into the Ballot Counting and Sorting Machine, in accordance with embodiments of the present invention.

Step 602 (Voted ballot counting-sorting machine initialization): Assessor enters the Jurisdiction's specific fixed number, as well as the jurisdiction's public key by the use of the Assessor Key Matrix (406). Then, the process goes to step 604.

Step 604 (Voted Ballot Paper Screening): Ballots to be counted, that were preliminarily checked and validated through the Ballot Box (104) are loaded into the Ballot Counting and Sorting Machine (400). The RFID Reader Module (402) beams the loaded ballot paper, reads ballot paper beaming data from all RFID tag registers and transmits the ballot paper beaming data to the Authentication and Validation Checker (404). Then, the process goes to step 606.

Step 606 (Voted Ballot Paper authentication): The Authentication and Validation Checker (404) runs the jurisdiction's public/private signature (212) located in the first data field (208) of the basic RFID tag (202) through its checker. In addition, it runs the assessor's signature key (214) located in the second data field (210) of the basic RFID tag (202) through its checker. Then, it compares the jurisdiction's signature and the assessor's signature key with the confidential jurisdiction code constant and the confidential assessor code constant, respectively, which starts authentication of voted ballot paper and sends result to the Decision Handler (412). Then the process goes to step 608.

In step 608, a status is made to check the integrity of the voted ballot paper. The Decision Handler (412) checks the result delivered by the checker computation at step 606. If the check results are valid then the corresponding ballot paper is valid and the process goes to step 612; otherwise the ballot paper is not valid and the process goes to step 610.

Step 610 (Voted Ballot paper rejection): Voted ballot paper is not valid and is rejected by the Decision Handler (412). The rejected voted ballot paper rolls out to a bin outside the Ballot Counting and Sorting Machine (400). Then the process loops back to step 604.

In step 612, a status is made to check that the voted ballot paper is blank. The Fuse Blowing Checker (408) receives the voted ballot paper and states the on-tag fuse of the burnable passive RFID tag (204). If the Fuse Blowing Checker (408) detects a non-blowing of the on-tag fuse then the voted ballot paper is valid and the process goes to step 614; otherwise the voted ballot paper is not blank and the process goes to step 610.

Step 614 (Unlocking Voted ballot paper): The Fuse Blowing Engine (410) initiates the on-tag fuse blowing operation of the burnable passive RFID tag (204). This operation frees the hard-coded identification hosted in the RFID tag field that reveals the candidate/party

What is claimed is:

1. A voting method, comprising:
    receiving a ballot paper that includes a recorded vote comprising candidate/party information for an election held on a voting day in a jurisdiction, said ballot paper comprising a burnable radio frequency identification (RFID) tag that includes an on-tag fuse that is not blown, said recorded vote not being revealable while the fuse is not blown and being revealable in response to the fuse being subsequently blown;
    after said receiving, authenticating said ballot paper;
    after said authenticating, blowing the fuse to reveal the recorded vote; and
    after said blowing the fuse, counting the ballot paper and directing the ballot paper to a candidate box.

2. The method of claim 1, wherein the paper ballot further comprises a basic RFID tag that differs from the burnable RFID tag, and wherein the method further comprises:
    storing a signature of the jurisdiction in a first data field of the basic RFID tag; and
    receiving from an assessor on the voting day a confidential jurisdiction code constant,
    wherein said authenticating comprises determining a first match between the received confidential jurisdiction code constant and the signature of the jurisdiction stored in the first data field of the basic RFID tag.

3. The method of claim 2, wherein the signature of the jurisdiction stored in the first data field of the basic RFID tag is encrypted with a private key belonging to an emitting authority associated with the jurisdiction, and wherein said determining the first match comprises:
    decrypting the private key with a public key of a public/private key pair that includes the private key, said decrypting the private key generating an unencrypted signature of the jurisdiction; and
    determining that the received confidential jurisdiction code constant and the unencrypted signature of the jurisdiction match each other.

4. The method of claim 2, wherein said determining the first match warrants that the voting method is operating in a secure protocol.

5. The method of claim 2, wherein the received confidential jurisdiction code constant is valid only on the voting day.

6. The method of claim 2, wherein the received confidential jurisdiction code constant cannot be modified.

7. The method of claim 2, wherein the method further comprises personalizing the ballot paper by encoding an instruction set into the basic RFID tag.

8. The method of claim 2, wherein the method further comprises:
    receiving from the assessor on the voting day a confidential assessor code constant;
    after determining the first match, generating a signature key of the assessor;
    storing the generated signature key in a second data field of the basic RFID tag, wherein said authenticating comprises determining a second match between the received confidential assessor code constant and the signature key stored in the second data field of the basic RFID tag.

9. The method of claim 8, wherein the received confidential assessor code constant is valid only on the voting day.

10. The method of claim 8, wherein the received confidential assessor code constant cannot be modified.

11. The method of claim 8, wherein the generated signature key comprises a hashing of individual secret keys of the assessor.

12. The method of claim 8, wherein the generated signature key comprises the recorded vote.

13. The method of claim 8, wherein said authenticating comprises:
    after said storing the generated signature key and before said determining the second match, determining that the fuse is not blown.

14. The method of claim 13, wherein said authenticating comprises after determining that the fuse is not blown:
    obtaining from the assessor on the voting day the confidential jurisdiction code constant and the confidential assessor code constant;
    determining a third match between the obtained confidential jurisdiction code constant and the signature of the jurisdiction stored in the first data field of the basic RFID tag;
    determining a fourth match between the obtained confidential assessor code constant and the signature key stored in the second data field of the basic RFID tag
    after said determining the third match and said determining the fourth match, determining that the fuse is not blown.

15. The method of claim 2, wherein the basic RFID tag is a passive RFID tag.

16. The method of claim 1, wherein the burnable RFID tag is a passive RFID tag.

17. The method of claim 1, wherein the burnable RFID tag is a chipless RFID tag.

18. The method of claim 1, wherein the burnable RFID tag comprises a hard-coded identification of the ballot paper, and wherein the hard-coded identification hosts unchangeable data related to the candidate/party information.

19. The method of claim 18, wherein the ballot paper comprises a masking code that hides content of the hard-coded ballot identification.

20. The method of claim 1, wherein said blowing the fuse results in the ballot paper being unique and not reusable.

* * * * *